US011651324B2

(12) United States Patent
Veraart et al.

(10) Patent No.: US 11,651,324 B2
(45) Date of Patent: May 16, 2023

(54) SYSTEM AND METHOD FOR PRODUCT DELIVERY USING A FULFILLMENT MODEL

(71) Applicant: Mastercard International Incorporated, New York, NY (US)

(72) Inventors: Thomas Veraart, Manhasset, NY (US); Simon O'Regan, Cobh (IE)

(73) Assignee: Mastercard International Incorporated, New York, NY (US)

( * ) Notice: Subject to any disclaimer, the term of this patent is extended or adjusted under 35 U.S.C. 154(b) by 76 days.

(21) Appl. No.: 17/232,111

(22) Filed: Apr. 15, 2021

(65) Prior Publication Data

US 2022/0335379 A1 Oct. 20, 2022

(51) Int. Cl.
*G06Q 10/087* (2023.01)
*G06Q 10/0834* (2023.01)

(52) U.S. Cl.
CPC ..... *G06Q 10/08345* (2013.01); *G06Q 10/087* (2013.01)

(58) Field of Classification Search
CPC ............ G06Q 10/08345; G06Q 10/087
USPC ............................................... 705/28
See application file for complete search history.

(56) References Cited

U.S. PATENT DOCUMENTS

| 7,668,761 | B2 * | 2/2010 | Jenkins | G06Q 10/087 |
| | | | | 705/28 |
| 7,945,487 | B2 | 5/2011 | Ruef et al. | |
| 10,535,034 | B2 * | 1/2020 | Zhang | G06Q 10/087 |
| 2003/0083947 | A1 | 5/2003 | Hoffman et al. | |
| 2005/0075954 | A1 | 4/2005 | Matsumoto et al. | |
| 2006/0085299 | A1 | 4/2006 | Goll et al. | |
| 2013/0159145 | A1 | 6/2013 | Stevens | |
| 2014/0143007 | A1 | 5/2014 | Faulkenberg et al. | |
| 2016/0185466 | A1 | 6/2016 | Dreano, Jr. | |
| 2017/0293881 | A1 | 10/2017 | Narkulla | |
| 2018/0260867 | A1 | 9/2018 | Lin et al. | |

(Continued)

FOREIGN PATENT DOCUMENTS

WO 0023929 A1 4/2000

OTHER PUBLICATIONS

PCT/US2022/019291 International Search Report and Written Opinion dated Jun. 28, 2022, pp. 1-11.

*Primary Examiner* — Garcia Ade
(74) *Attorney, Agent, or Firm* — Pramudji Law Group PLLC; Ari Pramudji (57) ABSTRACT

Various implementations directed to a system and method for product delivery using a fulfillment model are provided. In one implementation, a method may include generating a fulfillment database for fulfillers, where the fulfillment database includes inventory data and location data. The method may also include receiving order data from an originator, where the order data includes delivery data and product data corresponding to a transaction between a customer and the originator, and where the product data includes data corresponding to a product purchased by the customer from the originator. The method may further include determining optimal prices for the fulfillers using a pricing model based on the order data and the fulfillment database. The method may additionally include selecting a first fulfiller using a fulfillment model based on the order data, the fulfillment database, and the optimal prices.

20 Claims, 3 Drawing Sheets

(56) References Cited

U.S. PATENT DOCUMENTS

| | | |
|---|---|---|
| 2018/0322561 A1 | 11/2018 | Arora |
| 2018/0349851 A1 | 12/2018 | Gupta et al. |
| 2019/0122176 A1* | 4/2019 | Wu .................... G06Q 30/0205 |
| 2020/0074399 A1 | 3/2020 | Scholl et al. |
| 2022/0245574 A1* | 8/2022 | Celia ....................... G06F 9/451 |

* cited by examiner

SYSTEM AND METHOD FOR PRODUCT DELIVERY USING A FULFILLMENT MODEL

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In some scenarios, a customer may place an order with a business for a product with an expectation that the product will be provided by a particular date. A customer may be a consumer, another business, and/or the like. However, at times, the business may be unable to provide the product to the customer by the particular date for one or more reasons. Such reasons may include, but are not limited to, delayed shipment from a supplier and/or other entities in a supply chain, logistical delays, production delays, weather-induced delays, transportation problems, unexpected shortages in inventory, and/or the like.

SUMMARY

Described herein are implementations of various technologies relating to a system and method for product delivery using a fulfillment model. In one implementation, a method may include generating a fulfillment database for a plurality of fulfillers, where the fulfillment database includes inventory data and location data. The method may also include receiving order data from an originator, where the order data includes delivery data and product data corresponding to a transaction between a customer and the originator, and where the product data includes data corresponding to a product purchased by the customer from the originator. The method may further include determining a plurality of optimal prices for the plurality of fulfillers using a pricing model based on at least the order data and the fulfillment database. The method may additionally include selecting a first fulfiller of the plurality of fulfillers using a fulfillment model based on at least the order data, the fulfillment database, and the plurality of optimal prices. In addition, the method may include transmitting delivery command data to a delivery device, where the delivery device is configured to perform a delivery of the product from the first fulfiller to a designated location for the customer based on the delivery command data.

In another implementation, a method may include generating a fulfillment database for a plurality of fulfillers, where the fulfillment database includes inventory data and location data. The method may also include receiving order data from an originator, where the order data includes delivery data and product data corresponding to a transaction between a customer and the originator, and where the product data includes data corresponding to a product purchased by the customer from the originator. The method may further include determining a plurality of optimal prices for the plurality of fulfillers using a pricing model based on at least the order data and the fulfillment database. The method may additionally include selecting a first fulfiller of the plurality of fulfillers using a fulfillment model based on at least the order data, the fulfillment database, and the plurality of optimal prices. In addition, the method may include arranging a delivery of the product by a deliverer from the first fulfiller to a designated location for the customer.

In yet another implementation, a system may include one or more processors and one or more memory. The one or more memory may include a plurality of program instructions which, when executed by the one or more processors, cause the one or more processors to generate a fulfillment database for a plurality of fulfillers, where the fulfillment database includes inventory data and location data. The plurality of program instructions may also include instructions which, when executed by the one or more processors, cause the one or more processors to receive order data from an originator, where the order data includes delivery data and product data corresponding to a transaction between a customer and the originator, and where the product data includes data corresponding to a product purchased by the customer from the originator. The plurality of program instructions may further include instructions which, when executed by the one or more processors, cause the one or more processors to determine a plurality of optimal prices for the plurality of fulfillers using a pricing model based on at least the order data and the fulfillment database. The plurality of program instructions may additionally include instructions which, when executed by the one or more processors, cause the one or more processors to select a first fulfiller of the plurality of fulfillers using a fulfillment model based on at least the order data, the fulfillment database, and the plurality of optimal prices. In addition, the plurality of program instructions may include instructions which, when executed by the one or more processors, cause the one or more processors to transmit delivery command data to a delivery device, where the delivery device is configured to perform a delivery of the product from the first fulfiller to a designated location for the customer based on the delivery command data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to a system and method for product delivery using a fulfillment model will now be described in the following paragraphs with reference to FIGS. 1-3.

As is known, a business may offer one or more products for sale to its customers. A business may be any entity known to those skilled in the art, such as a vendor, a manufacturer, a supplier, a warehouse, a retail chain, a franchisor, and/or the like. In addition, a customer may be a consumer, a middleman, another business, and/or the like. The one or more products offered for sale may be any good and/or service known to those skilled in the art. Goods may include parts, materials, merchandise, supplies, equipment, components, food, and/or the like.

As noted above, a customer may purchase a product from a business with an expectation that the product will be provided by a specified date in the future. At times, though, the business may be unable to provide the product to the customer by the specified date for one or more reasons. Such reasons may include, but are not limited to, delayed shipment from a supplier and/or other entities in a supply chain, sourcing issues, logistical delays, production delays, weather-induced delays, transportation problems, unforeseen demand for the product, unexpected shortages in inventory, and/or the like. As used herein, inventory may refer to the products available at a facility associated with a business.

A business may attempt to resolve the issue of unavailability by turning to one or more other businesses to supply the product. However, searching for replacement products can be time-consuming and/or expensive, and, despite its efforts, the business may still fail to provide the product to the customer by the specified date. Further, for cases in which there is insufficient time to perform a search, the business may be forced to acquire a replacement product from an unknown provider, which may increase the risk that the customer may receive a product that is defective, fraudulent, costlier than average, of poor quality, and/or the like. For example, a small business may not have access to a wide network of suppliers to make up for an unexpected shortfall in inventory of a certain good, and, in the interest of time, may be forced to acquire additional inventory from an unknown supplier for twice the average price for the good.

In view of the above, various implementations of a system and method for product delivery using a fulfillment platform are described herein, where the fulfillment platform may be used to ultimately deliver a product for a business. In some implementations, the fulfillment platform may receive a request from a business to fulfill a product need. The fulfillment platform may be used to select another business that can fulfill the need, where the selection may be based on, at least, inventory, pricing, demand, distance, delivery costs, and/or the like. The fulfillment platform may then arrange for delivery of the product from the selected fulfiller for the requesting business.

I. System

Figure 1:
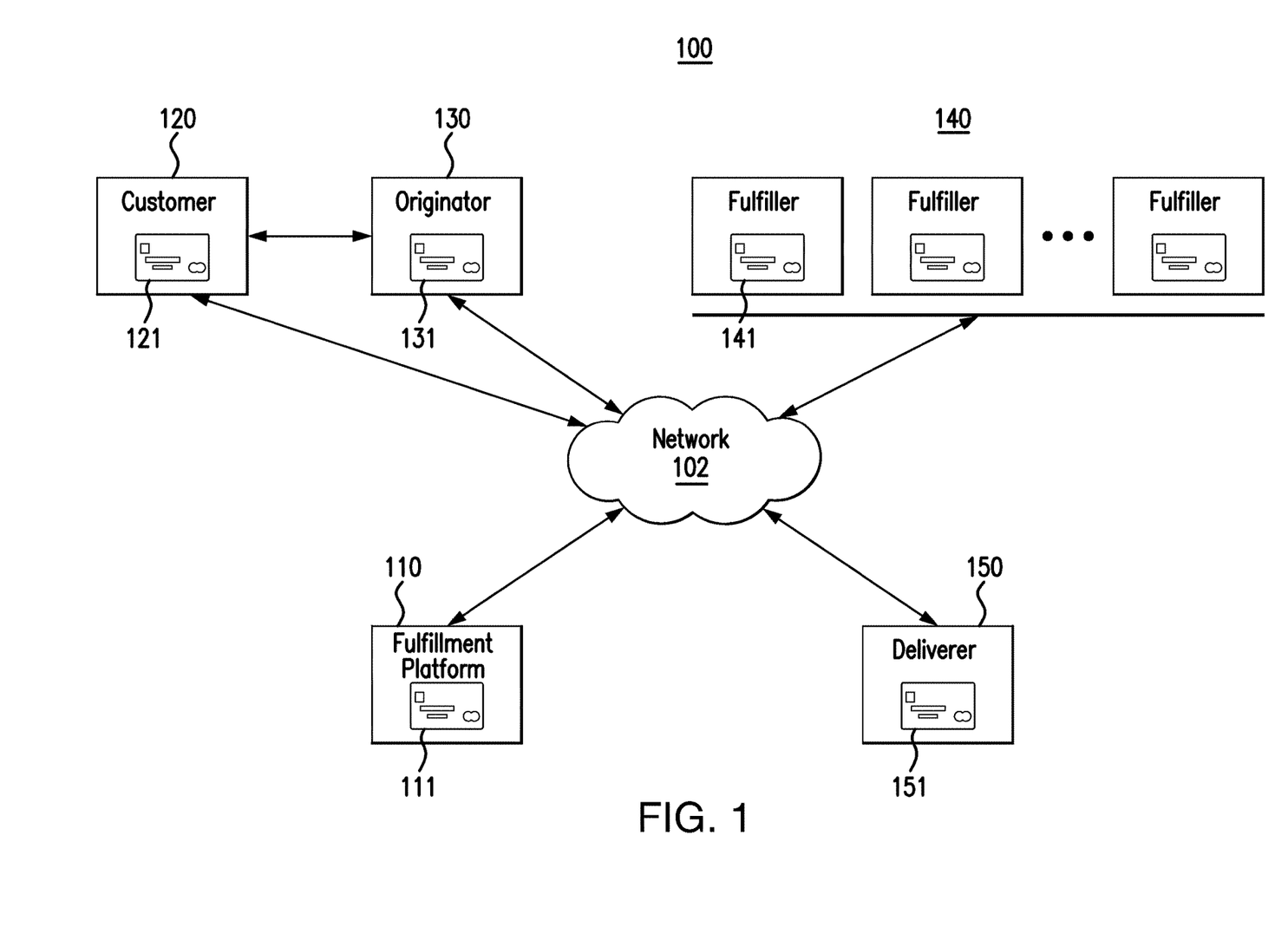
FIG. 1 illustrates a schematic diagram of a system using a fulfillment platform in accordance with implementations of various techniques described herein.

FIG. 1 illustrates a schematic diagram of a system 100 using a fulfillment platform 110 in accordance with implementations of various techniques described herein. The system 100 may include a network 102, the fulfillment platform 110, a customer 120, an originator 130, a plurality of fulfillers 140, and a deliverer 150.

The fulfillment platform 110, the originator 130, the plurality of fulfillers 140, and the deliverer 150 may be in communication with one another via the network 102. In a further implementation, the customer 120 may also be in communication via the network 102. The network 102 may include, but is not limited to, one or more of the following components: a local area network (LAN), a wide area network (WAN) (e.g., the Internet), a mobile network, a virtual network, and/or any other public and/or private network known in the art capable of supporting communication among two or more of the elements of the system 100.

In one implementation, and as similarly discussed above, the customer 120 may purchase a product from the originator 130 with an expectation that the product will be provided at a designated location by a specified date in the future. The customer 120 may be similar to the customer described above in that the customer 120 may be a consumer, a middleman, a business, and/or the like. The product may be similar to the one or more products described above. The originator 130 may be any business known to those skilled in the art, such as a vendor, a manufacturer, a supplier, a warehouse, a store, a retail chain, a franchisor, and/or the like. In some implementations, the originator 130 may own, operate, and/or have access to one or more physical facilities (e.g., a warehouse, a store, and/or the like) from where the originator 130 may attempt to provide the product for the customer 120.

The designated location may represent a location that has been assigned to and/or agreed upon by both the customer 120 and the originator 130, and the designated location may represent a location where the customer 120 can access the product by the specified date. In one such implementation, the customer 120 may expect, by the specified date, for the product to be delivered to the designated location, such as a location associated with the customer 120. In another implementation, the customer 120 may expect, by the specified date, for the product to be available to be picked up from the designated location, such as a location associated with the originator 130.

In some implementations, the specified date may be a specific date and/or time that has been agreed to by both the customer 120 and the originator 130. In another implementation, the specified date may represent a range of dates and/or times for when the product will be provided. In yet another implementation, the specified date may represent a date and/or time by when a person known in the art would expect the product to be provided.

The customer 120 may purchase the product from the originator 130 using any form of communication known to those skilled in the art. In one implementation, the customer 120 may use offline communication to purchase the product from the originator 130. In such an implementation, the customer 120 may place an order for the product by calling the originator 130 via a telephone, by visiting a facility of the originator 130 and making the order in person, and/or the like.

In another implementation, the customer 120 may purchase the product from the originator 130 using online communication via one or more computing devices 121 and the network 102. The one or more computing devices 121 may include any computing device known to those skilled in the art, including mobile devices, personal computers, and/or laptops. Various implementations of the one or more computing devices 121 are discussed later with respect to FIG. 3. As further explained below, the one or more computing devices 121 may be configured to perform one or more operations described herein, including transmitting an order for the product to the originator 130 via the network 102, where the order may include information regarding the product and the delivery of the product. In a further implementation, and as described later, the customer 120 may be able to communicate with the fulfillment platform 110 via the one or more computing devices 121 and the network 102.

Similarly, the originator 130 may use one or more computing devices 131 to receive the order for the product from the customer 120 via the network 102. The one or more computing devices 131 may include any computing device known to those skilled in the art, including one or more servers, workstations, personal computers, and/or laptops. Various implementations of the one or more computing devices 131 are discussed later with respect to FIG. 3. As further explained below, the one or more computing devices 131 may be configured to perform one or more operations described herein, including receiving the order from the customer 120 and transmitting data regarding its product need to the fulfillment platform 110.

The fulfillment platform 110 may be used to find one or more fulfillers of the plurality of fulfillers 140 that are able to provide the product for the originator 130. In some implementations, the fulfillment platform 110 may be operated by and/or provided by an entity, where the entity may be unrelated to the customer 120, the originator 130, and/or the plurality of fulfillers 140. In other implementations, the entity may be related to at least one fulfiller of the plurality of fulfillers 140.

The fulfillment platform 110 may be a software-based system, a hardware-based system, or combinations thereof. In particular, the fulfillment platform 110 may include, and/or may be implemented using, one or more computing devices 111. The one or more computing devices 111 may include any computing device known to those skilled in the art, such as one or more servers. Various implementations of the one or more computing devices 111 are discussed later with respect to FIG. 3. As further explained below, the fulfillment platform 110, through its one or more computing devices 111 and its interactions with the originator 130 and the fulfillers 140, may be configured to perform one or more operations described herein, including receiving a request from the originator 130 to fulfill a product need, selecting a fulfiller from the plurality of fulfillers 140 to meet the need using a pricing model and a fulfillment model, and arranging for delivery of the product from the selected fulfiller for the originator 130.

Each fulfiller of the plurality of fulfillers 140 may be any business known to those skilled in the art, such as a vendor, a manufacturer, a supplier, a warehouse, a store, a retail chain, a franchisor, and/or the like. In particular, each fulfiller may store an inventory of one or more products that can be provided by the fulfiller. The inventory may be stored in one or more physical facilities (e.g., a warehouse, a store, and/or the like) owned by, operated by, and/or accessible to the fulfiller. The inventory of products may include one or more types and/or quantities of products, and, for one or more of the fulfillers, the inventory may include the product requested by the originator 130. In one implementation, each of the plurality of fulfillers 140 may have the same inventory of products. In another implementation, at least one fulfiller may store an inventory of products that differs from the inventories of other fulfillers. In one such implementation, at least one fulfiller may store one or more products that correspond to a different commercial industry than the products of other fulfillers.

Each fulfiller of the plurality of fulfillers 140 may operate one more computing devices 141, which may include any computing device known to those skilled in the art. For example, the one or more computing devices 141 may include one or more servers, workstations, personal computers, and/or laptops. Various implementations of the one or more computing devices 141 are discussed later with respect to FIG. 3. As further explained below, the one or more computing devices 141 may be configured to perform one or more operations described herein, including transmitting data (e.g., inventory data) to the fulfillment platform 110 via the network 102. As is also explained later, the fulfillment platform 110, through its interactions with the fulfillers 140, may use this data to select a fulfiller from the plurality of fulfillers 140 via a pricing model and a fulfillment model.

The deliverer 150 may be used to deliver the product requested by the originator 130 from a selected fulfiller. In some implementations, the deliverer 150 may be an individual or an entity that is unrelated to the customer 120, the originator 130, or the plurality of fulfillers 140. For example, the deliverer 150 may be a courier service. In other implementations, the deliverer 150 may be an individual or an entity that is related to at least one of the customer 120, the originator 130, or the plurality of fulfillers 140. For example, the deliverer 150 may be a delivery employee of the selected fulfiller.

The deliverer 150 may use one or more computing devices 151 to deliver the product requested by the originator 130 from the selected fulfiller. The one or more computing devices 151 may include any computing device known to those skilled in the art, including mobile devices, personal computers, and/or laptops. Various implementations of the one or more computing devices 151 are discussed later with respect to FIG. 3. As further explained below, the one or more computing devices 151 may be configured to perform one or more operations described herein, including communicating with the fulfillment platform 110 via the network 102. In addition, though not shown in FIG. 1, the deliverer 150 may also use one or more delivery devices to deliver the product requested by the originator 130 from the selected fulfiller. The one or more delivery devices may include any delivery device known to those skilled in the art, including automated vehicles, semi-automated vehicles, unmanned aerial vehicles (UAV), drones, robotic devices, and/or the like.

Although not shown in FIG. 1, the system 100 may also include a payment network, where the payment network may be able to communicate with other elements of the system 100 via the network 102. In one implementation, the payment network may be used to facilitate and/or process payments between the originator 130 and the selected fulfiller. In a further implementation, the payment network may be used to facilitate and/or process payments between the originator 130 and the customer 120. The payment network may include any payment network and/or payment system known to those skilled in the art, such as Banknet of MasterCard International Incorporated.

In another implementation, the computing devices mentioned above may be configured to perform one or more operations as described herein using one or more applications downloaded to, installed in, and/or active in the computing devices. In one such implementation, the entity operating and/or providing the fulfillment platform 110 may also provide these applications. In a further implementation, the fulfillment platform 110 and the computing devices mentioned above may communicate with one another using any technique known to those skilled in the art. For example, though not shown in FIG. 1, the fulfillment platform 110 and the computing devices of the customer 120, the originator 130, the plurality of fulfillers 140, and/or the deliverer 150 may communicate with one another using one or more application programming interfaces (APIs) associated with the applications.

Moreover, although the system 100 is presented in one arrangement, other implementations may include one or more elements of the system 100 in different arrangements and/or with additional elements. For example, though one customer 120 is shown transacting with the originator 130, those skilled in the art will understand that the implementations described herein may be applied to scenarios in which multiple customers purchase products from the originator 130. In another example, though one originator 130 is shown in FIG. 1, those skilled in the art will understand that the implementations described herein may be applied to scenarios in which multiple originators may communicate with the fulfillment platform 110.

II. Operation

In operation, the system 100 may be used to find one or more fulfillers of the plurality of fulfillers 140 that can provide a product for the originator 130. In particular, one or more elements of the system 100 (e.g., the fulfillment platform 110) may be used to receive a request from the originator 130 to fulfill a product need, select a fulfiller from the plurality of fulfillers 140 to meet the need using a pricing model and a fulfillment model, and then arrange for delivery of the product from the selected fulfiller for the originator 130.

A. Fulfiller Enrollment

Initially, before the system 100 can be used to provide the product for the originator 130, a number of businesses may need to enroll as fulfillers 140 with the fulfillment platform 110. A business may choose to enroll as a fulfiller for any number of reasons, such as to access a different customer base, to increase its revenue, and/or the like. In some implementations, the entity that operates and/or provides the fulfillment platform 110 may allow a business to enroll as a fulfiller with the platform 110 through a service and/or subscription agreement with the entity.

In one implementation, prior to enrollment, a business may use its one or more computing devices (e.g., computing devices 141) to download, install, and/or activate one or more applications associated with the platform 110. As noted above, the entity operating and/or providing the fulfillment platform 110 may also provide these applications. Using these one or more applications, the business may be able to communicate with the fulfillment platform 110 via the network 102. In another implementation, the business may use a web browser installed on one of its computing devices (e.g., computing devices 141) to communicate with the fulfillment platform 110 via the network 102. In particular, the entity operating and/or providing the fulfillment platform 110 may provide and/or host a web portal through which the business may access the fulfillment platform 110.

The business may then initiate an enrollment process to become a fulfiller using the one or more applications or the web portal. In one implementation, the one or more computing devices of the business may, through the applications or the web browser, display a prompt indicating that the business is to provide profile data corresponding to the business in order to enroll as a fulfiller. The business may provide the profile data to the applications or the web browser via one or more input devices of its computing devices.

The profile data may include data relating to a username, a password, and/or the like for the business. In particular, the one or more computing devices of the business may display a request for the business to create and provide a username and a password. In a further implementation, the one or more applications or the web portal may be used to generate a unique identifier, a unique public and private encryption key pair, and/or the like for the business, which may also be included as part of the profile data of the business.

The profile data may also include data relating to one or more attributes of the business, such as inventory data, location data, shipping data, and/or payment data. The one or more computing devices of the business, through the applications or the web browser, may display a request that the business provide such data, as well. Inventory data may include any data relating to the one or more products offered for sale by the business. For example, the inventory data may include data relating to a tracking code for each product offered for sale by the business, such as a stock-keeping unit (SKU). The inventory data may also include data relating to the quantities of each product available in inventory, the one or more costs associated with each product offered for sale (e.g., acquisition cost, maintenance cost, production cost, storage cost, and/or the like), an industry designation for each product offered for sale, and/or the like.

As noted above, the business may provide the inventory data via one or more input devices of its computing devices. The one or more input devices may include a keyboard, a mouse, a stylus, a camera, a touch sensitive panel (e.g., a touch pad or a touch screen, etc.), acquisition equipment, and/or any other input devices known in the art. In one implementation, the business may use the acquisition equipment to acquire the inventory data and then provide this data to its one or more computing devices. The acquisition equipment may include any equipment known in the art that can detect the presence of a product in a facility, such as sensors, readers, scanners, and/or cameras. For example, the acquisition equipment may include radio-frequency identification (RFID) readers used to detect tags attached to products, ultra-wideband (UWB) sensors used to detect the movement of products in a facility, barcode scanners used to detect barcodes printed on products, cameras used to obtain images of products in a facility that can be interpreted using artificial intelligence and/or computer vision, and/or the like. In such an example, an employee of the business may use this acquisition equipment to detect the products available in its facilities, and then transmit data (i.e., inventory data) regarding the detected products to the one or more computing devices. The one or more computing devices may then include this inventory data as part of the profile data provided to the applications or the web browser described above.

Location data may include any data relating to an address or a location associated with the business. For example, the location data may include data relating to a street address for one or more physical facilities associated with the business, where the physical facilities may include a warehouse, a store, an office, and/or the like. Shipping data may include any data relating to shipping options available to the business. For example, the shipping data may include data relating to types of shipment (e.g., freight, truck, air, etc.), classes of shipment (e.g., standard, express, etc.), costs associated with the types and classes of shipment (e.g., average costs per mile per shipping type and/or class), estimated delivery times for the types and classes of shipment, and/or the like. Payment data may include any data relating to payment accounts (e.g., bank accounts, credit card accounts, etc.) through which the business may send and/or receive payment for products, such as through the payment network discussed above.

Once provided by the business, the one or more computing devices of the business may transmit the profile data to the fulfillment platform 110 via the network 102. The profile data may be stored in a fulfillment database located in memory associated with the one or more computing devices 111. The fulfillment database may be a database that may be generated or organized using any techniques known to those skilled in the art, where the database may include the profile data for each of the plurality of fulfillers 140. Once the profile data for the business is stored in the fulfillment database, the enrollment process for the business may be complete, and the fulfillment platform 110 may designate the business as a fulfiller. In order to enroll the plurality of fulfillers 140 for the fulfillment platform 110, the above steps may be repeated for each business seeking to become a fulfiller.

In some implementations, a fulfiller may be able to update its profile data in the fulfillment database. In one such implementation, with each sale of a product, the fulfiller may provide updated inventory data to the platform 110, such as through an input device of one of its computing devices 141 and through the one or more applications or the web portal described above. The input device may include the acquisition equipment mentioned above (e.g., RFID readers, UWB sensors, barcode scanners, cameras, etc.). For example, the acquisition equipment may be positioned in a facility of the fulfiller (e.g., near an exit, on a shelf, etc.) such that the equipment may detect when the product is removed from the facility, such as for a sale. Once the equipment detects the removal of the product, the one or more computing devices 141 of the fulfiller may transmit updated profile date (i.e., updated inventory data) to the platform 110. The platform 110 may, in turn, then update its fulfillment database to reflect the updated profile data for the fulfiller. In one implementation, a fulfiller may automatically update its profile data in the fulfillment database in real-time or near real-time using its computing devices 141, its associated acquisition equipment, the network 102, and the computing devices 111.

In another implementation, each fulfiller may also provide capacity data to the fulfillment platform 110, where the platform 110 may store the capacity data as part of the fulfiller's profile data in the fulfillment database. Capacity data may include any data relating to a production capacity, shipment capacity, order capacity, and/or the like for the fulfiller. For example, the capacity data may include data that indicates whether the fulfiller has reached its production capacity and/or whether the fulfiller is accepting new orders for one or more of its products. In such an example, the fulfiller may use the capacity data to cease accepting new orders via the platform 110, such as during busy periods or if the fulfiller is having production issues.

In some implementations, the fulfillment platform 110 may also provide data to be stored as part of a fulfiller's profile data in the fulfillment database. In one such implementation, the fulfillment platform 110 may provide ratings data to be stored as part of a fulfiller's profile data. The ratings data for a fulfiller may include data relating to ratings, reviews, and/or feedback assigned to the fulfiller and received from parties (e.g., an originator) who have previously transacted with the fulfiller via the platform 110. The ratings, reviews, and/or feedback may reflect a level of satisfaction that the party experienced when transacting with the fulfiller. For example, an originator may rate the fulfiller between 0 to 5 based on its experience with the fulfiller, with a 5 rating representing the highest level of satisfaction.

In another implementation, the fulfillment platform 110 may provide industry data to be stored as part of a fulfiller's profile data, where the industry data may include data relating to an industry designation for the fulfiller. The industry designation may be derived based on inventory data for the fulfiller and may be based on any merchant categorization database known in the art, such as the Dun & Bradstreet DUNS Number database. In some implementations, each fulfiller may provide the industry data to be stored as part of the fulfiller's profile data. In yet another implementation, the fulfillment platform 110 may provide at least some of the shipping data for a fulfiller, such as data relating to costs associated with the types and classes of shipment, estimated delivery times for the types and classes of shipment, and/or the like.

B. Customer-Originator Transaction

Once the fulfillment platform 110 has generated its fulfillment database for a plurality of fulfillers 140, the platform 110 may be used by an originator 130 to find one or more fulfillers that can provide a product. As noted above, as part of a transaction between the customer 120 and the originator 130, a customer 120 may purchase a product from the originator 130 with an expectation that the product will be provided at a designated location by a specified date in the future. The customer 120 may purchase the product by placing an order for the product with the originator 130 and providing payment for the product at the time of the order or at a later date (e.g., after the product is provided by the specified date). In some implementations, the purchased product may have one or more associated tracking codes (e.g., SKU), may be purchased in various quantities, and/or may have an associated price that the customer 120 paid or agreed to pay to the originator 130 for the product.

As mentioned above, the designated location may represent a location that has been assigned to and/or agreed upon by both the customer 120 and the originator 130, and the designated location may represent a location where the customer 120 can access the product by the specified date. The designated location may be a location associated with the customer 120, a location associated with the originator 130, a third-party location, and/or the like. For example, the customer 120 may expect, by the specified date, for the product to be delivered to a location associated with the customer 120, such as a home of the customer 120, a facility (e.g., a warehouse, a store, and/or the like) of the customer 120, and/or the like. In another example, the customer 120 may expect, by the specified date, for the product to be available to be picked up by the customer 120 from a location associated with the originator 130, such as a facility (e.g., a warehouse, a store, and/or the like) of the originator 120. In yet another example, the customer 120 may expect, by the specified date, for the product to be available to be picked up by the customer 120 from a third-party location not associated with the customer 120 and/or the originator 130, such as a pickup locker operated by a separate entity.

As also noted above, in some implementations, the specified date may be a specific date and/or time that has been agreed to by both the customer 120 and the originator 130 as part of the transaction. In another implementation, the specified date may represent a range of dates and/or times for when the product will be provided. In yet another implementation, the specified date may represent a date and/or time by when a person known in the art would expect the product to be provided. In some implementations, the originator 130 may determine the specified date based on the designated location mentioned above.

C. Fulfillment Platform Access

As noted above, for any number of reasons, the originator 130 may be unable to provide the purchased product to the customer 120 at the designated location by the specified date. Such reasons may include a delayed shipment from a supplier and/or other entities in a supply chain, sourcing issues, logistical delays, production delays, weather-induced delays, transportation problems, unforeseen demand for the product, unexpected shortages in inventory, and/or the like.

As such, in one implementation, the originator 130 may use the fulfillment platform 110 to find one or more fulfillers of the plurality of fulfillers 140 that can provide the product to the customer 120 at the designated location by the specified date. In particular, the originator 130 may use the platform 110 to find a fulfiller that can arrange for delivery of the product, by the specified date, to a location associated with the customer 120, a location associated with the originator 130, a third-party location, and/or the like.

To access the fulfillment platform 110 to find a fulfiller, the originator 130 may initially need to enroll with the platform 110 as an originator. In some implementations, the entity that operates and/or provides the fulfillment platform 110 may allow the originator 130 to enroll as an originator with the platform 110 through a service and/or subscription agreement with the entity.

In one implementation, the originator 130 may be unrelated to the plurality of fulfillers 140 already enrolled with the platform 110. In such an implementation, the originator 130 may use its one or more computing devices 131 to download, install, and/or activate the one or more applications mentioned above, which may be used to communicate with the platform 110 via the network 102. In another implementation, the originator 130 may use a web browser installed on one of its computing devices 131 to communicate with the fulfillment platform 110 via the network 102 and a web portal.

The originator 130 may then initiate an enrollment process using the one or more applications or the web portal. The one or more computing devices 131 may, through the applications or the web browser, display a prompt indicating that the originator 130 is to provide originator profile data corresponding to the originator 130 in order to enroll. The originator 130 may provide the originator profile data to the applications or the web browser via one or more input devices of its computing devices 131.

The originator profile data may include data relating to a username, a password, and/or the like for the originator 130. In particular, the one or more computing 131 may display a request for the originator 130 to create and provide a username and a password. In a further implementation, the one or more applications or the web portal may be used to generate a unique identifier, a unique public and private encryption key pair, and/or the like for the originator 130, which may also be included as part of the originator profile data.

The originator profile data may also include data relating to one or more attributes of the originator 130, such as originator contact data and/or originator payment data. Originator contact data may include any data relating to contact information for the originator 130, such as a name, street address, and/or the like. For example, the originator contact data may include data relating to a street address for one or more physical facilities associated with the originator 130. Originator payment data may include any data relating to payment accounts (e.g., bank accounts, credit card accounts, etc.) through which the originator 130 may send and/or receive payment, such as through the payment network discussed above.

Once provided by the originator 130, the one or more computing devices 131 may transmit the originator profile data to the fulfillment platform 110 via the network 102. The originator profile data may be stored in an originator database located in memory associated with the one or more computing devices 111. The originator database may be a database that may be generated or organized using any techniques known to those skilled in the art. Once the originator profile data for the originator 130 is stored in the originator database, the enrollment process for the originator 130 may be complete. Upon successfully enrolling with the platform 110, the originator 130 may, through the one or more applications or the web portal, access the fulfillment platform 110 using its one or more computing devices 131 and the network 102.

In a further implementation, the fulfillment platform 110 may provide originator ratings data to be stored as part of an originator's profile data. The originator ratings data may include data relating to ratings, reviews, and/or feedback assigned to the originator 130 and received from parties (e.g., a fulfiller) who have previously transacted with the originator 130 via the platform 110. The ratings, reviews, and/or feedback may reflect a level of satisfaction that the party experienced when transacting with the originator 130, such as the 0-5 scale mentioned above.

In another implementation, the originator 130 may have previously enrolled as one of the plurality of fulfillers 140. In such an implementation, the originator 130 may use the username and password created during the fulfiller enrollment process in order to access the platform 110, allowing the originator 130 to find a different fulfiller that can provide the product for the originator 130. The one or more computing devices 131 of the originator 130 may, through the one or more applications or the web portal mentioned above, display a prompt indicating that the originator 130 is to provide data relating to a username, a password, and/or the like to the fulfillment platform 110. Once provided by the originator 130, the one or more computing devices 131 may transmit the data to the fulfillment platform 110 via the network 102. Using this data, the platform 110 may authenticate the originator 130 using the profile data stored in the fulfillment database. Upon successful authentication, the originator 130 may, through the one or more applications or the web portal, access the fulfillment platform 110 using its one or more computing devices 131 and the network 102.

D. Order Data

Upon successfully accessing the fulfillment platform 110, the originator 130 may use the fulfillment platform 110 to find one or more fulfillers that can supply the product purchased by the customer 120 and provide it at the designated location by the specified date. To find the one or more fulfillers that can do so, the originator 130 may provide order data to the fulfillment platform 110. In particular, the one or more computing devices 131 may, through the one or more applications or the web browser, display a prompt indicating that the originator 130 is to provide the order data to the platform 110 in order to find one or more fulfillers. The originator 130 may provide the order data to the applications or the web browser via one or more input devices of its computing devices 131.

The order data may include data relating to one or more attributes of the transaction between the customer 120 and the originator 130, such as product data and delivery data. In some implementations, the customer 120 may have provided the product data and the delivery data to the originator while purchasing or requesting the product, such as by providing the data using offline communication (e.g., telephone or in-person) or online communication (e.g., use one or more computing devices 121 to transmit product data and delivery data to one or more computing devices 131).

Product data may include any data relating to the product purchased by the customer 120. For example, the product data may include data relating to a tracking code for the purchased product (e.g., the SKU), the quantity of the product that was purchased, the price that the customer 120 paid or agreed to pay to the originator 130 for the product, an industry designation for the purchased product, and/or the like.

Delivery data may include any data that relates to the designated location mentioned above, such as data relating to a name and a street address for the designated location. In one implementation, the delivery data may include data relating to a location associated with the customer 120 where the purchased product is to be delivered. For example, the delivery data may include data relating to a name and address for a home of the customer 120, a facility (e.g., a warehouse, a store, and/or the like) of the customer 120, and/or the like. In another implementation, the delivery data may include data relating to a location associated with the originator 130 from where the purchased product is to be picked up. For example, the delivery data may include data relating to a name and address for a facility (e.g., a warehouse, a store, and/or the like) of the originator 130. In yet another implementation, the delivery data may include data relating to a third-party location from where the purchased product is to be picked up. For example, the delivery data may include data relating to a name and address for a facility of the third party.

The delivery data may also include any data that relates to the specified date mentioned above. For example, the delivery data may include data relating to a specific date and/or time that has been agreed to by both the customer 120 and the originator 130. In another example, the delivery data may include data relating to a range of dates and/or times for when the product will be provided. In yet another example, the delivery data may include data relating to a date and/or time by when a person known in the art would expect the product to be provided. In another example, the delivery data may include data relating to a date determined by the originator 130 based on the designated location.

The order data provided by the originator 130 may also include prioritization data. Prioritization data may include data that reflects the priorities of the originator 130 when finding a fulfiller using the fulfillment platform 110. In one such implementation, the prioritization data may include data that indicates whether the originator 130 places an importance on one or more of the following factors when finding a fulfiller: minimizing price, ensuring on-time delivery, and prior ratings history. For example, the originator 130 may rank these factors in order of importance via the above-mentioned applications or the web browser and using the input devices of its computing devices 131. In another example, the originator 130 may select one or more of these factors as being important via the applications or the web browser and using the input devices of its computing devices 131. In a further implementation, the order data may also include data derived from the originator database, such as the originator contact data, the originator payment data, and/or the originator ratings data associated with the originator 130.

E. Pricing and Fulfillment Models

Once provided by the originator 130, the one or more computing devices 131 may transmit the order data to the fulfillment platform 110 via the network 102. In turn, the platform 110 may use this data to find one or more fulfillers for the originator 130. In one implementation, utilizing the order data, the fulfillment platform 110 may use a pricing model and/or a fulfillment model to find one or more fulfillers that can provide the product purchased by the customer 120 at the designated location by the specified date. The pricing model and/or the fulfillment model may include one or more algorithms, equations, and/or the like and may be implemented using the one or more computing devices 111.

In particular, the fulfillment platform 110 may use the pricing model to determine optimal prices between the originator 130 and the plurality of fulfillers 140. An optimal price may represent a recommended price at which the originator 130 should pay a respective fulfiller for providing the product to the customer 120 at the designated location by the specified date.

In one implementation, the fulfillment platform 110 may use the pricing model to determine an optimal price between the originator 130 and each fulfiller of the plurality of fulfillers 140. In another implementation, the fulfillment platform 110 may use the pricing model to determine an optimal price between the originator 130 and each fulfiller of a subset of the plurality of fulfillers 140. In one such implementation, the fulfillment platform 110 may choose the subset of fulfillers by searching and/or querying the fulfillment database using any technique known to those skilled in the art. For example, the platform 110 may use the fulfillment database to choose fulfillers whose inventory data includes data for an SKU that matches the SKU of the purchased product (as indicated by the order data). In another example, the platform 110 may use the fulfillment database to choose fulfillers whose inventory data includes an industry designation that matches the industry designation of the purchased product (as indicated by the order data). In yet another example, the platform 110 may use the fulfillment database to choose fulfillers whose profile data includes industry data that matches the industry designation of the purchased product (as indicated by the order data). A fulfiller for whom an optimal price is determined may hereinafter be referred to as a relevant fulfiller.

For each relevant fulfiller, the fulfillment platform 110 may derive one or more numerical values from the order data and/or from data extracted from the fulfillment database, and these numerical values may be used as inputs to the pricing model. The fulfillment platform 110 may extract the data from the fulfillment database using any search and/or query techniques known to those skilled in the art. In one implementation, the fulfillment platform 110 may extract inventory data, location data, and shipping data from the fulfillment database.

In a further implementation, the fulfillment platform 110 may derive numerical values from the product data and the delivery data of the order data and from the inventory data, location data, and shipping data of the fulfillment database. Such numerical values may include, but are not limited to, values relating to one or more of the following: the distance between the designated location and the fulfiller, costs associated with the types and classes of shipment of the product between the designated location and the fulfiller, quantities of the product available in inventory of the fulfiller, one or more costs associated with the product for the fulfiller, the quantity of the product that was purchased by the customer 120, the price that the customer 120 paid or agreed to pay to the originator 130 for the product, the number of orders for the product from all originators using the platform 110, the quantity of the product available in inventory for all fulfillers 140, and/or the like.

In a further implementation, the fulfillment platform 110 may provide a numerical value for a profit split as an input to the pricing model. The profit split may represent a percentage of net profit earned by the fulfiller after providing the product to the customer 120 at the designated location by the specified date. In one example, the fulfillment platform 110 may set the profit split to fifty percent by default. In some implementations, the remaining percentage of net profit may be provided to the originator 130, the entity operating and/or providing the platform 110, or both.

In one implementation, using the above-mentioned numerical values, the fulfillment platform 110 may use the pricing model to determine an optimal price between the originator 130 and a fulfiller based on a sum of estimated shipping costs to the designated location, estimated costs associated with the product for the fulfiller, and an estimated fulfiller fee to be earned by the fulfiller after providing the product. In such an implementation, the pricing model may be implemented using one or more equations, such as Equation 1:

$$\text{Optimal Price} = (\text{Distance})(\text{Shipping Cost}) + (\text{Fulfiller Product Cost})(\text{Quantity Purchased}) + (\text{Profit Split})(\text{Price Paid} - \text{Fulfiller Product Cost} - (\text{Distance})(\text{Shipping Cost})) \quad (1)$$

where Distance represents the distance between the designated location and the fulfiller, Shipping Cost represents average shipping cost per mile for a particular shipping type and/or class, Fulfiller Product Cost represents the total cost associated with the product for the fulfiller (e.g., a sum of acquisition costs, maintenance costs, production costs, storage costs, and/or the like), Quantity Purchased represents the quantity of the product that was purchased by the customer 120, Profit Split represents the profit split set by the platform 110, and Price Paid represents the price that the customer 120 paid or agreed to pay to the originator 130 for the product. In particular, the product of the Distance and Shipping Cost may represent an estimated shipping cost to the designated location, the product of the Fulfiller Product Cost and the Quantity Purchased may represent an estimated cost associated with the purchased product for the fulfiller, and the remaining term in Equation 1 may represent an estimated fulfiller fee to be earned by the fulfiller after providing the product. The Optimal Price output by Equation 1 may be a recommended price at which the originator 130 should pay a respective fulfiller for providing the product to the customer 120 at the designated location by the specified date (e.g., Optimal Price=$46.50 for a certain fulfiller).

Though not shown in Equation 1, one or more of the variables used in the pricing model may be weighted. The weight for each variable may be determined based on input from the originator 130, based on previous transactions between the originator 130 and the fulfillers 140, based on historical preferences of an average originator or fulfiller according to previous transactions, and/or the like. In addition, though not shown in Equation 1, the pricing model may incorporate a demand calculation in the estimated fulfiller fee mentioned above. In particular, the demand calculation may incorporate numerical values corresponding to a demand for the purchased product, where such values may include the number of orders for the product from all originators using the platform 110, the quantity of the product available in inventory for all fulfillers 140, and/or the like.

After determining an optimal price for each relevant fulfiller, the fulfillment platform 110 may use the fulfillment model to determine a best match for the originator 130 among the relevant fulfillers. In particular, the fulfillment model may be used to produce a numerical match score, such that a relevant fulfiller with the highest match score may be considered to be the best match for the originator 130.

For each relevant fulfiller, the fulfillment platform 110 may derive one or more numerical values from the order data and/or from data extracted from the fulfillment database, and these numerical values may be used as inputs to the fulfillment model. The fulfillment platform 110 may extract the data from the fulfillment database using any search and/or query techniques known to those skilled in the art. In one implementation, the fulfillment platform 110 may extract the inventory data, the location data, the shipping data, the ratings data, and the capacity data from the fulfillment database. In addition, the optimal price determined for each relevant fulfiller may be used as an input to the fulfillment model.

In a further implementation, the fulfillment platform 110 may derive numerical values from the product data, the delivery data, and the prioritization data of the order data. In addition, the fulfillment platform 110 may derive numerical values from the inventory data, the location data, the shipping data, the ratings data, and the capacity data of the fulfillment database. Such numerical values may include, but are not limited to, values relating to one or more of the following: a tracking code for the purchased product (e.g., the SKU), the quantity of the product that was purchased by the customer 120, the price that the customer 120 paid or agreed to pay to the originator 130 for the product, the distance between the designated location and the fulfiller, whether the fulfiller is accepting new orders for the product, quantities of the product available in inventory of the fulfiller, average rating for the fulfiller, estimated delivery times for the types and classes of shipment of the product between the designated location and the fulfiller, priorities of the originator 130, and/or the like.

In addition, as similarly explained above, one or more of the variables used in the fulfillment model may be weighted. The weight for each variable may be determined based on input from the originator 130, based on previous transactions between the originator 130 and the fulfillers 140, based on historical preferences of an average originator or fulfiller according to previous transactions, and/or the like. For example, the weights used may be based on historical preferences and on the prioritization data received from the originator 130.

In one implementation, using the above-mentioned numerical values, the fulfillment platform 110 may use the fulfillment model to determine a match score between the originator 130 and a relevant fulfiller based on inventory of the fulfiller, capacity of the fulfiller, delivery time for the fulfiller, priorities of the originator 130, average rating for the fulfiller, and the optimal price determined earlier. In such an implementation, the pricing model may be implemented using one or more equations, such as Equation 2:

$$\text{Match Score} = (\text{In Stock})(\text{New Orders})((\text{Delivery Weight})(\text{Delivery Delay}) + (\text{Price Weight})(\text{Optimal Price}) + (\text{Ratings Weight})(\text{Rating})) \quad (2)$$

The In Stock variable may represent a binary value, where the variable is equal to 1 if the quantities of the product in inventory for the fulfiller is greater than or equal to the quantity of the product that was purchased by the customer 120. The variable may be equal to 0 if not. The New Orders variable may represent a binary value, where the variable is equal to 1 if the fulfiller is accepting new orders for the product and is equal to 0 if the fulfiller is not. The Delivery Weight variable may represent a weight as determined by the platform 110, where the weight may be a default value that can be increased if the originator 130 considers ensuring on-time delivery of the product to be a priority. The Delivery Delay may represent the length of time (e.g., days), if any, that delivery of the product to the customer 120 may be delayed. The Price Weight variable may represent a weight as determined by the platform 110, where the weight may be a default value that can be increased if the originator 130 considers minimizing an optimal price of the product to be a priority. The Ratings Weight variable may represent a weight as determined by the platform 110, where the weight may be a default value that can be increased if the originator 130 considers prior ratings history of the fulfiller to be a priority. The Ratings variable may represent the average rating for the fulfiller. The Match Score output by Equation 2 may be a numerical match score for the fulfiller (e.g., Match Score=0.95 for a certain fulfiller).

Accordingly, the fulfillment platform 110 may use the fulfillment model to determine a match score for each relevant fulfiller, and the platform 110 may use these match scores to select the best-matched fulfiller that can supply the product purchased by the customer 120 and provide it at the designated location by the specified date. For example, the platform 110 may rank the relevant fulfillers based on their respective match scores, with a higher match score corresponding to a better-matched fulfiller and a higher ranking. For implementations in which multiple fulfillers have equivalent match scores, the platform 110 may use a tiebreaker to determine the higher ranked fulfiller. Such a tiebreaker may include assigning a higher rank to the fulfiller with the shortest distance to the designated location, the lowest optimal price, and/or the like.

F. Originator-Fulfiller Agreement

After selecting the relevant fulfiller with the highest match score, the fulfillment platform 110 may provide details of a potential agreement to the originator 130 and the highest-ranked fulfiller. In particular, the platform may transmit the details to the respective computing devices (e.g., computing devices 131 and 141) of the originator 130 and the highest-ranked fulfiller. The computing devices may, through one or more applications or a web browser, display a prompt with details of the potential agreement.

The details may include that, for a determined optimal price, the highest-ranked fulfiller agrees to supply the product purchased by the customer 120 and provide it at the designated location by the specified date. The details may also state that, according to the potential agreement, the highest-ranked fulfiller agrees to ship the product in accordance with the type and class of shipment used in determining the match score for the fulfiller. The details may further include the proposed profit share between the originator 130 and the highest-ranked, which may be set to fifty percent by default by the platform 110. The details may additionally include liability provisions for the agreement, such as financial remedies in the event of a late or damaged liability (e.g., an evenly shared liability between the originator 130 and the highest-ranked fulfiller). In some implementations, the originator 130 and the highest-ranked fulfiller may be able to renegotiate one or more details of the agreement through a messaging application implemented through the platform 110.

To finalize the agreement, the platform 110 may require that the originator 130 and the highest-ranked fulfiller transmit confirmation data to the platform 110, where the confirmation data may include data indicating whether the party consents to the agreement. Such data may include an image of a signature, an image of government-issued identification, and/or the like. In some implementations, the originator 130 and/or the highest-ranked fulfiller may refuse to consent to the agreement. As such, the confirmation data from the non-consenting party may indicate the rejection of the agreement. The platform 110 may then provide details of a potential agreement to the originator 130 and to a next highest-ranked fulfiller. Once the platform 110 receives confirmation data from the originator 130 and a fulfiller that each party consents to the agreement, then fulfiller and the platform 110 may proceed with arranging for delivery of the product for the originator 130. The fulfiller that consents to the agreement may hereinafter be referred to as the confirmed fulfiller.

G. Delivery

The fulfillment platform 110, the confirmed fulfiller, and/or the deliverer 150 may arrange for delivery of the product to the customer 120 at the designated location by the specified date. In one implementation, the platform 110 may transmit delivery command data to the confirmed fulfiller. The delivery command data may include the delivery data previously received as part of the order data from the originator 130, data relating to the type and class of shipment used in determining the match score for the confirmed fulfiller, and/or any other type of data that may be used by the confirmed fulfiller in arranging delivery of the product.

As noted above, the delivery data may include any data that relates to the designated location mentioned above, such as data relating to a name and a street address for the designated location. The delivery data may also include any data that relates to the specified date. The delivery command data may also include data indicating the type and/or style packaging that should be applied to the product prior to delivery to the designated location. For example, the data may indicate that the confirmed fulfiller should apply packaging that illustrates the branding of the originator 130 to the product before delivery. In such an example, the confirmed fulfiller may be considered as providing the product on behalf of the originator 130, such that the customer 120 may be unaware that the product was provided by an entity other than the originator 130.

Upon receiving the delivery command data, the confirmed fulfiller may arrange for delivery of the product with the deliverer 150. In particular, the confirmed fulfiller may transmit the delivery command data to the one or more computing devices 151 operated by the deliverer 150. As noted above, in some implementations, the deliverer 150 may be an individual or an entity that is unrelated to the customer 120, the originator 130, or the plurality of fulfillers 140. For example, the deliverer 150 may be a courier service. In other implementations, the deliverer 150 may be an individual or an entity that is related to at least one of the customer 120, the originator 130, or the plurality of fulfillers 140. For example, the deliverer 150 may be a delivery employee of the selected fulfiller.

In one implementation, the deliverer 150 may then use the delivery command data to perform delivery of the product from the confirmed fulfiller to the customer 120 at the designated location by the specified time. In particular, the deliverer 150 may acquire the product from a physical facility (e.g., a warehouse, a store, an office, and/or the like) of the confirmed fulfiller and then transport the product to the designated location by the specified time. In a further implementation, for scenarios in which the deliverer 150 is unrelated to the confirmed fulfiller, the fulfillment platform 110 may include location data for the confirmed fulfiller in the delivery command data, where the location data may include data relating to a street address for the physical facility of the confirmed fulfiller that stores the product.

As mentioned above, the deliverer 150 may use one or more delivery devices to deliver the product requested by the originator 130 from the selected fulfiller. The one or more delivery devices may include any delivery device known to those skilled in the art, including automated vehicles, semi-automated vehicles, unmanned aerial vehicles (UAV), drones, robotic devices, and/or the like. In some implementations, the respective computing devices of the confirmed fulfiller and/or the deliverer 150 may transmit the delivery command data to one or more computing devices of the delivery device, where the delivery command data may also include location data (e.g., data relating to a street address for the physical facility of the confirmed fulfiller that stores the product). The delivery device may be configured to acquire the product from the physical facility of the confirmed fulfiller and then transport the product to the designated location by the specified time.

In another implementation, the platform 110 may directly transmit the delivery command data to the one or more computing devices 151 operated by the deliverer 150. In a further implementation, the platform 110 may also directly transmit the delivery command data one or more computing devices of the delivery device.

In one implementation, the computing devices of the deliverer or the delivery device may, via the network 102, initially transmit start data to the fulfillment platform 110, to a computing device (e.g., computing device 141) of the confirmed fulfiller, to the one or more computing devices 131 of the originator 130, and/or to the one or more computing devices 121 of the customer 120 upon acquiring the product from the physical facility of the confirmed fulfiller. This transmission of the start data may indicate that the transport of the product to the designated location has commenced.

In another implementation, the confirmed fulfiller may transmit the start data to the fulfillment platform 110, to a computing device (e.g., computing device 141) of the confirmed fulfiller, to the one or more computing devices 131 of the originator 130, and/or to the one or more computing devices 121 of the customer 120. In particular, the confirmed fulfiller may transmit the start data once the product has exited the facility in which it was stored. In some implementations, the confirmed fulfiller may determine whether the product has exited the facility using the acquisition equipment described above. The acquisition equipment may include any equipment known in the art that can detect the presence of a product in a facility, such as sensors, readers, scanners, and/or cameras, including the examples mentioned above. In particular, the acquisition equipment may detect when a product has exited the physical facility, and the equipment may transmit this detection to the one or more computing devices (e.g., computing device 141) of the confirmed fulfiller. In turn, the computing devices may then transmit this detection to the platform 110 via the network 102, where the platform 110 may transmit the start data to the above-mentioned parties to indicate that the transport of the product has commenced.

In one implementation, while the deliverer 150 is transporting the product to the designated location by the specified time, the one or more computing devices 151 may, via the network 102, transmit tracking data to the fulfillment platform 110, to a computing device (e.g., computing device 141) of the confirmed fulfiller, to the one or more computing devices 131 of the originator 130, and/or to the one or more computing devices 121 of the customer 120. In another implementation, the one or more computing devices of the delivery device may, via the network 102, transmit tracking data to the fulfillment platform 110, to a computing device (e.g., computing device 140) of the confirmed fulfiller, to the one or more computing devices 131 of the originator 130, and/or to the one or more computing devices 121 of the customer 120. The tracking data may include any data corresponding to a geographic location of the product.

In particular, while transporting the product, the computing devices of the deliverer 150 or the delivery device may transmit the tracking data to the above-mentioned parties in real-time or near real-time. In one implementation, the computing devices may utilize a satellite-based navigation system (e.g., Global Positioning System (GPS)) to determine a geographic location of the product. In a further implementation, the computing devices may be configured to communicate with tags, sensors, or codes attached to the product, where the computing devices may use such devices to track the product relative to the computing devices. In another implementation, the tracking data may be provided via manual input to the computing devices.

When completing the delivery of the product to the designated location, the computing devices of the deliverer 150 or the delivery device may transmit completion data that indicates an arrival of the product at the designated location and a completion of the delivery. In one implementation, the computing devices may utilize the satellite-based navigation system to determine if the deliverer 150 or the delivery device has arrived at the designated location. In another implementation, the computing devices may analyze a loss of communication between the computing devices and the tags, sensors, or codes attached to the product and then determine that the product has been delivered to the designated location. In yet another implementation, if delivering the product to a location associated with the customer 120 (e.g., a customer's home), then acquisition equipment connected to the one or more computing devices 121 of the customer 120 may be used to detect the delivery of the product. For example, cameras used to obtain images that can be interpreted using artificial intelligence and/or computer vision may capture an image of the product delivery at the home of the customer 120. These images may trigger the one or more computing devices 121 to transmit the completion data to the fulfillment platform 110, to a computing device (e.g., computing device 140) of the confirmed fulfiller, and/or to the one or more computing devices 131 of the originator 130.

Once delivery of the product to the designated location has been completed, the fulfillment platform 110 may transmit a final notification of delivery to the computing device (e.g., computing device 140) of the confirmed fulfiller and/or to the one or more computing devices 131 of the originator 130. In some implementations, upon completion of the delivery, the payment network mentioned above may be used to transfer payments via the platform 102, such as payments between the originator 130 and the confirmed fulfiller, payments between the originator 130 and the customer 120, and/or payments between the confirmed fulfiller and the deliverer 150. In addition, upon completion of the delivery, the originator 130 and the confirmed fulfiller may provide ratings, reviews, and/or feedback for the other through the platform 110. The ratings, reviews, and/or feedback may be stored in respective profile data for the originator 130 and the confirmed fulfiller.

In another implementation, the fulfillment platform 110 may be configured to arrange for an automated delivery of the product for the customer 120 upon receiving the order data from the originator 130. In particular, after receiving the order data, the platform 110 may automatically determine the best-matched fulfiller using the order data and the fulfillment database. After determining the best-matched fulfiller, in some implementations, the agreement between the originator 130 and the best-matched fulfiller may be auto-accepted by both parties. The fulfillment platform 110 may then transmit the delivery command data to the deliverer 150, including to a delivery device associated with the deliverer 150. The delivery device may be configured to acquire the product from a physical facility of the fulfiller and then transport it to the designated location. The product may be tracked as described above (e.g., GPS), and delivery of the product may be confirmed as described above (e.g., GPS, acquisition equipment, and/or the like). Upon confirmation of delivery, the platform 110 may be configured to automatically initiate payments between the parties using the payment network.

Further, although operations above are discussed with respect to one arrangement of the system 100, those skilled in the art will understand that operation may be performed for other arrangements of the system 100 and/or with additional elements. For example, though a single purchased product is discussed with respect to a transaction between the customer 120 and the originator 130, those skilled in the art will understand that the implementations described herein may be applied to scenarios in which multiple products are purchased by the customer 120 from the originator 130. In another example, those skilled in the art will understand that the implementations described herein may be applied to scenarios in which a service is purchased by a customer 120 from the originator 130. In yet another example, though a transaction between the customer 120 and the originator 130 is discussed as involving a purchased product, those skilled in the art will understand that the implementations described herein may be applied to scenarios before the customer 120 formally purchases the product from the originator 130, such as where the customer 120 only purchases the product after the originator 130 confirms that the product is available via the platform 110.

Figure 2:
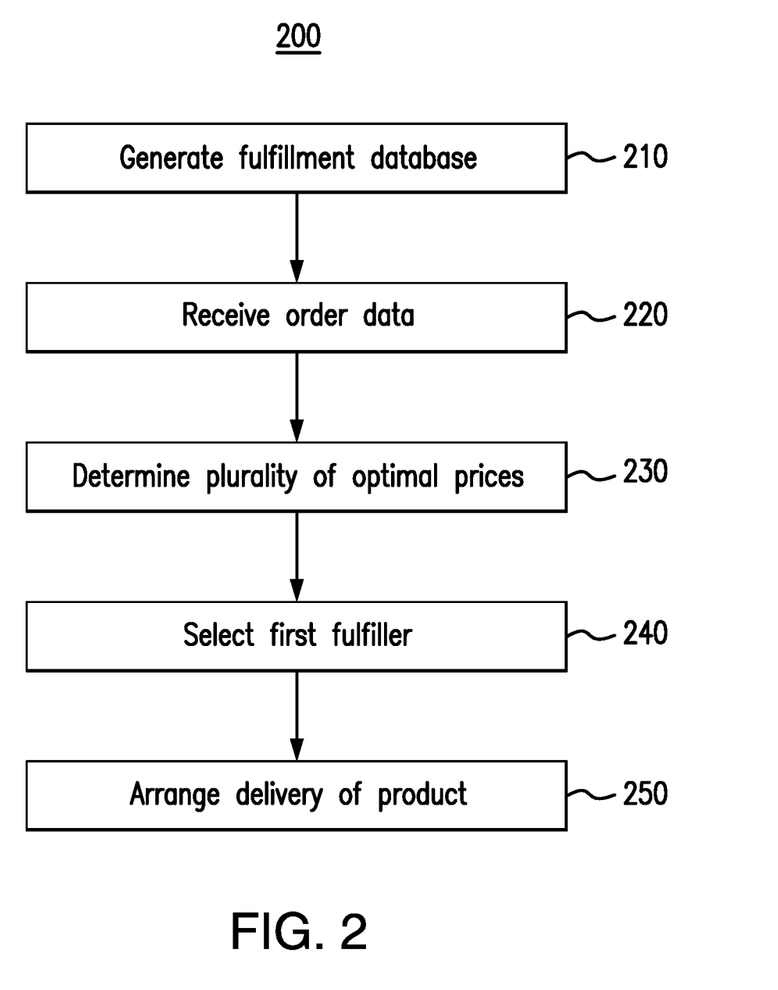
FIG. 2 illustrates a flow diagram of a method for using a fulfillment platform in accordance with implementations of various techniques described herein.

FIG. 2 illustrates a flow diagram of a method 200 for using a fulfillment platform in accordance with implementations of various techniques described herein. In one implementation, method 200 may be at least partially performed by a computing device, such as the one or more computing devices 111 discussed above. It should be understood that while method 200 indicates a particular order of execution of operations, in some implementations, certain portions of the operations might be executed in a different order. Further, in some implementations, additional operations or steps may be added to the method 200. Likewise, some operations or steps may be omitted.

At block 210, the computing device may generate a fulfillment database for a plurality of fulfillers. As noted above, the fulfillment database may include profile data for the plurality of fulfillers, where the profile data for each fulfiller may include inventory data, location data, shipping data, payment data, capacity data, ratings data, and/or industry data. Such profile data may be provided by the fulfiller and/or the fulfillment platform.

At block 220, the computing device may receive order data from an originator. As noted above, the order data may include data relating to one or more attributes of a transaction between a customer and the originator. As part of the transaction between the customer and the originator, the customer may purchase a product from the originator with an expectation that the product will be provided at a designated location by a specified date in the future. The order data may include product data, delivery data, prioritization data, and/or data derived from an originator database.

At block 230, the computing device may determine a plurality of optimal prices for the plurality of fulfillers using a pricing model based on at least the order data and the fulfillment database. An optimal price may represent a recommended price at which the originator should pay a respective fulfiller for providing the product to the customer at the designated location by the specified date. For each relevant fulfiller, the computing device may derive one or more numerical values from the order data and/or from data extracted from the fulfillment database, and these numerical values may be used as inputs to the pricing model.

At block 240, the computing device may select a first fulfiller of the plurality of fulfillers using a fulfillment model based on at least the order data, the fulfillment database, and the plurality of optimal prices. The fulfillment model may be used to produce a numerical match score, such that a relevant fulfiller with the highest match score may be considered to be the best match for the originator. For each relevant fulfiller, the computing device may derive one or more numerical values from the order data and/or from data extracted from the fulfillment database, and these numerical values may be used as inputs to the fulfillment model.

At block 250, the computing device may arrange a delivery of the product by a deliverer from the first fulfiller to the designated location for the customer. In one implementation, the computing device may transmit delivery command data to the first fulfiller, the deliverer, and/or a delivery device. The delivery command data may include the delivery data previously received as part of the order data from the originator, data relating to the type and class of shipment used in determining the match score for the confirmed fulfiller, and/or any other type of data that may be used by the confirmed fulfiller in arranging delivery of the product.

Accordingly, in view of the implementations discussed above with respect to FIGS. 1 and 2, a fulfillment model may be used for product delivery. As mentioned above, at times, a business may be unable to provide the product to the customer by the specified date for one or more reasons. In one implementation, the business may attempt to resolve the issue of unavailability by using the fulfillment platform with its pricing model and fulfillment model.

In particular, the business may be able to search for a fulfiller of the product that is able to perform a delivery of the product to a designated location by a specified time. Moreover, the business may be able to find a fulfiller that is able to perform the delivery in accordance with the priorities (e.g., minimizing price, ensuring on-time delivery, and prior ratings history) held by the business. The business may not otherwise be able to find a fulfiller that is able to perform the delivery in such a manner without the use of the fulfillment platform.

In addition, by using the fulfillment model, the business may be able to obtain a product for a customer in a time-efficient and/or cost-efficient manner, regardless of a previous ability of the business to access a network of suppliers for the product. For example, by using the fulfillment platform, the business may be able to shorten the waiting time to have the product provided for the customer and/or ensure delivery of the product for the customer, which may help the business avoid lost revenue due to its issues with product unavailability. As such, via the fulfillment platform, the business may be able to maximize sales revenue and/or customer service. Further, by using the fulfillment platform and its incorporation of ratings data for the fulfillers, the business may decrease its risk that one of its customers receives a product that is defective, fraudulent, costlier than average, of poor quality, and/or the like.

III. Computing Device

Figure 3:
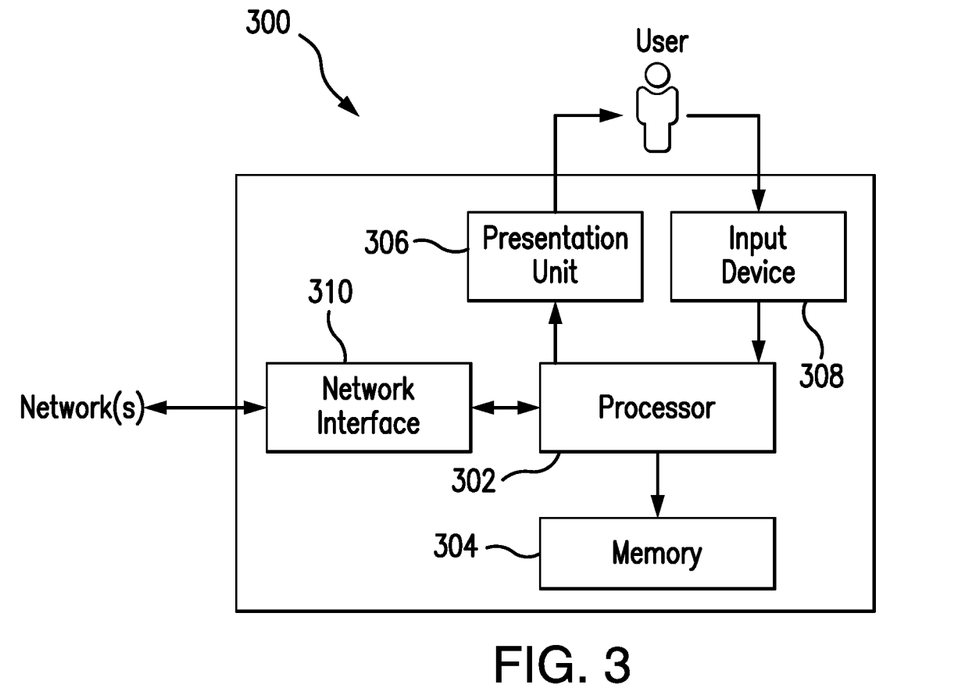
FIG. 3 illustrates a diagram of a computing device in which one or more various technologies described herein may be incorporated and practiced.

FIG. 3 illustrates a diagram of a computing device 300 in which one or more various technologies described herein may be incorporated and practiced. The computing device 300 may include, for example, one or more servers, workstations, personal computers, laptops, tablets, smartphones, personal digital assistants (PDAs), and/or the like. In one implementation, the computing device 300 may include a single computing device. In another implementation, the computing device 300 may include multiple computing devices located in close proximity or distributed over a geographic region, where the computing devices may be configured to function as described herein.

The computing device 300 can be used to implement one or more of the computing devices discussed above, such as the devices 111, 121, 131, 141, and 151. Those skilled in the art will understand that the system 100 may use different computing devices and/or arrangements of computing devices than those described with respect to FIG. 3. In addition, different components and/or arrangements of components may be used in other computing devices.

Referring to FIG. 3, the computing device 300 may include a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 304, as described herein, may include one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may be configured to store, without limitation, images, private and/or public keys, public/private key pairs, identity records, certified and/or certification records, hashed data, signed data, and/or other types of data (and/or data structures) suitable for use as described herein. Furthermore, in various implementations, computer-executable instructions may be stored in the memory 304 for execution by the processor 302 to cause the processor 302 to perform one or more of the functions described herein, such that the memory 304 may be a physical, tangible, and non-transitory computer readable storage media. Such instructions may be used to improve the efficiencies and/or performance of the processor 302 and/or other computer system components configured to perform one or more of the various operations herein. It should be appreciated that the memory 304 may include a variety of different memories, each implemented in one or more of the functions or processes described herein.

The computing device 300 may also include a presentation unit 306 that is coupled to (and that is in communication with) the processor 302. However, it should be appreciated that the computing device 300 could include output devices other than the presentation unit 306 and/or the like. The presentation unit 306 may output information, visually, for example, to a user. Further, one or more interfaces may be displayed at computing device 300, including at presentation unit 306, to display certain information. The one or more interfaces may be defined by the one or more applications mentioned above, defined by websites, defined by mobile applications, and/or the like. In addition, the one or more interfaces may be used to capture images of documents, capture selfies, capture biometrics, and/or the like. The presentation unit 306 may include, without limitation, a liquid crystal display (LCD), a light-emitting diode (LED) display, an organic LED (OLED) display, an "electronic ink" display, speakers, and/or the like. In some implementations, the presentation unit 306 may include multiple devices.

In addition, the computing device 300 may include an input device 308 configured to receive one or more inputs from a user (i.e., user inputs), such as in response to prompts from the one or more applications described above. The one or more inputs may include images of documents, images of a user (e.g., biometric data), and/or the like. The input device 308 may include a single input device or multiple input devices. The input device 308 may be coupled to (and in communication with) the processor 302. The input device 308 may include, for example, a keyboard, a pointing device, a mouse, a stylus, a camera, fingerprint scanner, a touch sensitive panel (e.g., a touch pad or a touch screen, etc.), acquisition equipment as described above, another computing device, an audio input device, or combinations thereof. In one implementation, a touch screen, such as that included in a tablet, a smartphone, or similar device, may behave as both a presentation unit and an input device. As mentioned above, the computing device may include or configured to be coupled to any equipment used to acquire one or more images of documents or biometric data. Such equipment may include a camera, a biometric sensor (e.g., fingerprint sensor, iris scanner, palm scanner, and/or the like), and/or any other device configured to acquire such data.

Further, the illustrated computing device 300 may include a network interface 310 coupled to (and in communication with) the processor 302 and the memory 304. The network interface 310 may include, without limitation, a wired network adapter, a wireless network adapter (e.g., a near field communication (NFC) adapter, a Bluetooth adapter, etc.), a mobile network adapter, and/or other devices capable of communicating to one or more different devices of the networks described herein. Further, in some implementations, the computing device 300 may include the processor 302 and one or more network interfaces incorporated into or with the processor 302. In some implementations, the computing device 300 may include global positioning system (GPS) capability, whereby the computing device 300 may determine its current geographic location, perform mapping applications, and/or the like.

The description provided herein may be directed to specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the detailed description, numerous specific details are set forth to provide a thorough understanding of the disclosure provided herein. However, the disclosure provided herein may be practiced without these specific details. In some other instances, well-known methods, procedures, components, circuits, and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   generating a fulfillment database for a plurality of fulfillers, wherein the fulfillment database comprises inventory data and location data;
   receiving order data from an originator, wherein the order data comprises delivery data and product data corresponding to a transaction between a customer and the originator, and wherein the product data comprises data corresponding to a product purchased by the customer from the originator;
   determining a plurality of optimal prices for the plurality of fulfillers using a pricing model based on at least the order data and the fulfillment database;
   selecting a first fulfiller of the plurality of fulfillers using a fulfillment model based on at least the order data, the fulfillment database, and the plurality of optimal prices, wherein selecting the first fulfiller of the plurality of fulfillers includes determining a plurality of match scores for the plurality of fulfillers using the fulfillment model, and selecting the first fulfiller based on a highest match score among the plurality of match scores; and
   transmitting delivery command data to a delivery device, wherein the delivery device is configured to perform a delivery of the product from the first fulfiller to a designated location for the customer based on the delivery command data.

2. The method of claim 1, wherein generating the fulfillment database comprises: receiving profile data from a respective fulfiller, wherein the received profile data comprises respective inventory data and respective location data for the respective fulfiller; and generating the fulfillment database based on the received profile data.

3. The method of claim 2, wherein the respective inventory data comprises data acquired using acquisition equipment by the respective fulfiller, wherein the data relates to inventory offered for sale by the respective fulfiller, and wherein the acquisition equipment comprises one or more sensors, one or more readers, one or more scanners, one or more cameras, or combinations thereof.

4. The method of claim 1, wherein the delivery data comprises data relating to an address for the designated location, wherein the designated location comprises a location where the product is to be provided for access by the customer by a predetermined date.

5. The method of claim 1, wherein the designated location comprises a location associated with the customer, a location associated with the originator, or a location associated with a third party.

6. The method of claim 1, wherein a respective optimal price comprises a recommended price at which the originator is to pay a respective fulfiller for delivering the product to the designated location for the customer, and wherein determining the plurality of optimal prices comprises: extracting at least respective inventory data, respective location data, and respective shipping data from the fulfillment database for a respective fulfiller; generating a plurality of numerical values for at least the product data, the delivery data, the respective inventory data, the respective location data, and the respective shipping data for the respective fulfiller; providing the plurality of numerical values as inputs to the pricing model; and determining a respective optimal price for the respective fulfiller using the pricing model.

7. The method of claim 6, wherein the pricing model is configured to determine a sum of estimated shipping cost between the respective fulfiller and the designated location, the estimated cost of the product for the respective fulfiller, and an estimated fee to be earned by the respective fulfiller after delivery of the product to the designated location.

8. The method of claim 6, wherein the plurality of numerical values comprises numerical values corresponding to a distance between the designated location and the respective fulfiller, a cost associated with shipping the product between the designated location and the respective fulfiller, a quantity of the product available in inventory of the respective fulfiller, a cost associated with the product for the fulfiller, a quantity of the product that was purchased by the customer, a price that the customer paid or agreed to pay to the originator for the product, a quantity of the product available in inventory for the plurality of fulfillers, a profit split between the originator and the respective fulfiller, or combinations thereof.

9. The method of claim 1, wherein selecting the first fulfiller comprises: extracting the inventory data, the location data, shipping data, ratings data, and capacity data from the fulfillment database for the plurality of fulfillers; generating a plurality of numerical values for the product data, the delivery data, the inventory data, the location data, the shipping data, the ratings data, the capacity data, and the plurality of optimal prices; and providing the plurality of numerical values as inputs to the fulfillment model, determining a plurality of match scores for the plurality of fulfillers using the fulfillment model; and selecting the first fulfiller based on the plurality of match scores.

10. The method of claim 9, wherein the plurality of numerical values comprises numerical values corresponding to a tracking code for the product, a quantity of the product that was purchased by the customer, a price that the customer paid or agreed to pay to the originator for the product, a distance between the designated location and a respective fulfiller, a binary value corresponding to whether the respective fulfiller is accepting an order for the product, a quantity of the product available in inventory of the respective fulfiller, an average rating for the respective fulfiller, an estimated delivery time for a type and class of shipment of the product between the designated location and the respective fulfiller, one or more priorities of the originator, or combinations thereof.

11. The method of claim 9, wherein:
one or more of the plurality of numerical values is weighted in the pricing model based on historical data of transaction, prioritization data of the originator, or combinations thereof; and
the prioritization data comprises data indicative of a priority for the originator for price minimization, on-time delivery, and prior ratings history.

12. The method of claim 9, wherein the first fulfiller comprises a respective fulfiller with a highest-ranked match score of the plurality of match scores, and wherein the respective fulfiller agrees to provide the product to the designated location.

13. The method of claim 1, wherein: the delivery device comprises one or more automated vehicles, one or more semi-automated vehicles, one or more unmanned aerial vehicles (UAV), one or more drones, one or more robotic devices, or combinations thereof, and the delivery device is configured to acquire the product from a facility associated with the first fulfiller.

14. The method of claim 1, wherein the delivery command data comprises data relating to packaging of the product and the delivery data, and wherein the delivery data comprises data relating to an address for the designated location.

15. The method of claim 1, further comprising: receiving tracking data from the delivery device during the delivery, wherein the tracking data comprises data corresponding to a geographic location of the product, and wherein the tracking data comprises data acquired using a satellite-based navigation system, one or more readers, one or more scanners, one or more cameras, or combinations thereof; and receiving confirmation data indicative of the delivery to the designated location for the customer using the delivery device.

16. A method, comprising:
generating a fulfillment database for a plurality of fulfillers, wherein the fulfillment database comprises inventory data and location data;
receiving order data from an originator, wherein the order data comprises delivery data and product data corresponding to a transaction between a customer and the originator, and wherein the product data comprises data corresponding to a product purchased by the customer from the originator;
determining a plurality of optimal prices for the plurality of fulfillers using a pricing model based on at least the order data and the fulfillment database;
selecting a first fulfiller of the plurality of fulfillers using a fulfillment model based on at least the order data, the fulfillment database, and the plurality of optimal prices, wherein selecting the first fulfiller of the plurality of fulfillers includes determining a plurality of match scores for the plurality of fulfillers using the fulfillment model, and selecting the first fulfiller based on a highest match score among the plurality of match scores; and
arranging a delivery of the product by a deliverer from the first fulfiller to a designated location for the customer.

17. The method of claim 16, wherein arranging the delivery comprises transmitting delivery command data to the deliverer, wherein the delivery command data comprises data relating to packaging of the product and the delivery data, and wherein the delivery data comprises data relating to an address for the designated location.

18. A system, comprising:
one or more processors; and
one or more memory comprising a plurality of program instructions which, when executed by the one or more processors, cause the one or more processors to:
generate a fulfillment database for a plurality of fulfillers, wherein the fulfillment database comprises inventory data and location data;
receive order data from an originator, wherein the order data comprises delivery data and product data corresponding to a transaction between a customer and the originator, and wherein the product data comprises data corresponding to a product purchased by the customer from the originator;
determine a plurality of optimal prices for the plurality of fulfillers using a pricing model based on at least the order data and the fulfillment database;
select a first fulfiller of the plurality of fulfillers using a fulfillment model based on at least the order data, the fulfillment database, and the plurality of optimal prices, wherein selecting the first fulfiller of the plurality of fulfillers includes determining a plurality of match scores for the plurality of fulfillers using the fulfillment model, and selecting the first fulfiller based on a highest match score among the plurality of match scores; and transmit delivery command data to a delivery device, wherein the delivery device is configured to perform a delivery of the product from the first fulfiller to a designated location for the customer based on the delivery command data.

19. The system of claim 18, wherein a respective optimal price comprises a recommended price at which the originator is to pay a respective fulfiller for delivering the product to the designated location for the customer.

20. The system of claim 18, wherein:
the delivery device comprises one or more automated vehicles, one or more semi-automated vehicles, one or more unmanned aerial vehicles (UAV), one or more drones, one or more robotic devices, or combinations thereof; and
the delivery device is configured to acquire the product from a facility associated with the first fulfiller.

* * * * *